United States Patent
Liu

(10) Patent No.: US 11,123,828 B1
(45) Date of Patent: Sep. 21, 2021

(54) EXTRACTION TOOL

(71) Applicant: Cheng-Hsiung Liu, Taichung (TW)

(72) Inventor: Cheng-Hsiung Liu, Taichung (TW)

( * ) Notice: Subject to any disclaimer, the term of this patent is extended or adjusted under 35 U.S.C. 154(b) by 0 days.

(21) Appl. No.: 16/935,956

(22) Filed: Jul. 22, 2020

(51) Int. Cl.
*B23P 19/04* (2006.01)
*B25B 27/02* (2006.01)
*B23P 19/02* (2006.01)

(52) U.S. Cl.
CPC ............... *B23P 19/04* (2013.01); *B23P 19/02* (2013.01); *B25B 27/02* (2013.01); *B23P 19/022* (2013.01); *B25B 27/023* (2013.01)

(58) Field of Classification Search
CPC ..... B23P 19/021; B23P 19/022; B23P 19/025; B23P 19/02; B23P 19/027; B23P 19/04; B25B 27/023; B25B 27/026; B25B 27/02; Y10T 29/53796; Y10T 29/53848; Y10T 29/53857; Y10T 29/53891
See application file for complete search history.

(56) References Cited

U.S. PATENT DOCUMENTS

| | | | | |
|---|---|---|---|---|
| 1,361,316 A | * | 12/1920 | Dotzer ................. | B25B 27/023 29/261 |
| 1,394,129 A | * | 10/1921 | Wickersham ........ | B25B 27/023 29/261 |
| 2,618,052 A | * | 11/1952 | Skaggs ................ | B25B 27/023 29/256 |
| 4,646,412 A | * | 3/1987 | Eade .................... | B25B 27/023 29/259 |
| 4,929,111 A | * | 5/1990 | Lauritano ............. | B25B 27/023 403/16 |
| 5,692,282 A | * | 12/1997 | Baca ................... | B25B 27/0028 29/235 |
| 2013/0067745 A1 | * | 3/2013 | Musuraca ............. | F16H 57/023 29/893 |
| 2014/0013567 A1 | * | 1/2014 | Titera .................... | B25B 27/023 29/426.1 |
| 2015/0121675 A1 | * | 5/2015 | Campoli ............. | B25B 27/0035 29/426.5 |

FOREIGN PATENT DOCUMENTS

| | | | | |
|---|---|---|---|---|
| CN | 105856156 A | * | 8/2016 | .......... B25B 27/023 |
| GB | 425684 A | * | 3/1935 | .......... B25B 27/023 |
| TW | M463176 U | | 10/2013 | |
| TW | M571290 U | | 12/2018 | |

OTHER PUBLICATIONS

Search Report on [Taiwanese] Patent Application No. 109123024, dated May 26, 2021.

* cited by examiner

*Primary Examiner* — Matthew P Travers

(57) ABSTRACT

An extraction tool includes a coupling disc, an operating rod and two pads, wherein the coupling disc is penetrated by an assembly hole, the operating rod is provided in the assembly hole, and the pads can be movably arranged on the coupling disc. The coupling disc is penetrated by four first through grooves, two second through grooves, two third through grooves and two fourth through grooves. Each of the pads respectively covers one of the fourth through grooves, and the pads are each penetrated by one fifth through groove, each fifth through groove communicates with one of the fourth through grooves, and one side of each fifth through groove forms an alignment relationship with one of two sides of each of the fourth through grooves.

8 Claims, 8 Drawing Sheets

EXTRACTION TOOL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an extraction tool, said extraction tool is used for removing a disc-shaped object from a shaft lever.

2. Description of Related Art Including Information Disclosed Under 37 CFR 1.97 and 37 CFR 1.98

Disc-shaped objects, such as flywheels, belt pulleys or automobile disc holders, are usually axially located on a shaft lever. With the disc holder of automobile for mounting rim, the disc holder is in contact with the automobile transmission shaft, and the disc holder is penetrated by an shaft hole on axis. The transmission shaft has a shaft lever, the shaft lever is axially put in the shaft hole.

There are two common types of combination of the disc holder and the rim. One is that the disc holder is penetrated by four to six punch holes. When the rim leans against the disc holder, several bolts are screwed in the punch holes through the rim. The other type is that the disc holder is provided with four to six bosses. When the rim leans against the disc holder, the bosses pass through the rim, and several nuts are screwed on the bosses.

It is known that a puller comprises a disc body and a push rod, wherein the disc body is penetrated by a bolt hole, the push rod is screwed in the bolt hole, the disc body is provided with several circular through holes around the bolt hole, the through holes are equidistant to the bolt hole.

To use the puller to remove the disc holder from the transmission shaft, a disc body with the corresponding quantity of through holes is selected according to the quantity of the punch holes or the bosses, and the disc body leans against the disc holder.

In the case the disc holder is penetrated by the punch holes, the through holes are opposite and connected to the punch holes respectively, and several bolts are screwed in the punch holes through the through holes, and the bolt head of the bolt props the disc body, the push rod is rotated to make one end of the push rod prop the shaft lever, and move towards the shaft lever. The disc body is linked with the disc holder, moving far from the transmission shaft, when the shaft lever withdraws from the shaft hole, the disc holder can be removed from the shaft lever the shaft lever.

In the case where the disc holder is provided with several bosses, and the disc body leans against the disc holder, the bosses penetrate the through holes respectively, several nuts are screwed on the bosses, and the nuts prop the disc body. The push rod is rotated to make one end of the push rod prop the shaft lever, and the disc body is linked with the disc holder, moving far from the transmission shaft, so as to remove the disc holder from the transmission shaft. For convenient description, the through holes and the bosses of the disc holder for positioning the rim are designated as positioning structures hereinafter.

The disc holders of different specifications have different quantities of the positioning structures. In terms of the disc holder for small cars, the quantity of the positioning structures is generally four to six. There have been pullers for removing the disc holder with four or five of the positioning structures, and there have been pullers for removing the disc holder with four or six of the positioning structures, but there is not a puller for removing the disc holder with four or five or six of the positioning structures, because if the disc body has to coordinate with four to six of the positioning structures, some through holes will be connected when penetrated by the corresponding through holes, so that the bolt head or the nut fails to prop the disc body effectively, when the push rod is operated, the disc body is stressed unevenly, the actuation is deflected, the disc holder cannot be removed effectively, or the disc holder is deformed due to deflection, and the shaft hole and the shaft lever even have interference phenomenon which destroys the shapes.

BRIEF SUMMARY OF THE INVENTION

The primary object of the present invention is to provide an extraction tool, which is applicable to removing discs of various specifications.

Based on said purpose, the technical characteristic of problem solving of the present invention is that the extraction tool is used for removing a disc-shaped object from a shaft lever along axial direction, wherein the disc-shaped object is penetrated by a an shaft hole, the disc-shaped object is provided with four or five or six positioning structures, the positioning structures are punch holes or bosses, and the positioning structures are distributed evenly and centered on the shaft hole around the shaft hole.

The extraction tool comprises: a coupling disc, the coupling disc is axially penetrated by an assembly hole; an operating rod, the operating rod is axially located in the assembly hole; and two pads, the pads can be movably arranged in the coupling disc. The coupling disc is axially penetrated by four first through grooves, two second through grooves, two third through grooves and two fourth through grooves. The first through grooves, the second through grooves, the third through grooves and the fourth through grooves are distributed radially and centered on the assembly hole, and the first through grooves are distributed evenly around the assembly hole. The fourth through grooves are adjacent to each other. The width of the first through grooves, the second through grooves and the third through grooves is W1, W1 coordinates with the positioning structure, the width of the fourth through groove is W2, W2>W1.

The pads cover the fourth through grooves respectively, the pads are penetrated by a fifth through groove, the fifth through groove is connected to the fourth through groove, the width of the fifth through groove is W3, W3 coordinates with the positioning structure, one side of the fifth through groove is in alignment relationship with any side of the fourth through groove.

In terms of main effect and advantage of the present invention, it can be used to remove discs of various specifications. When operating the operating rod, the coupling disc and the disc-shaped object are force balanced, and the reliability of the removal operation is high.

DETAILED DESCRIPTION OF THE INVENTION

Figure 1:
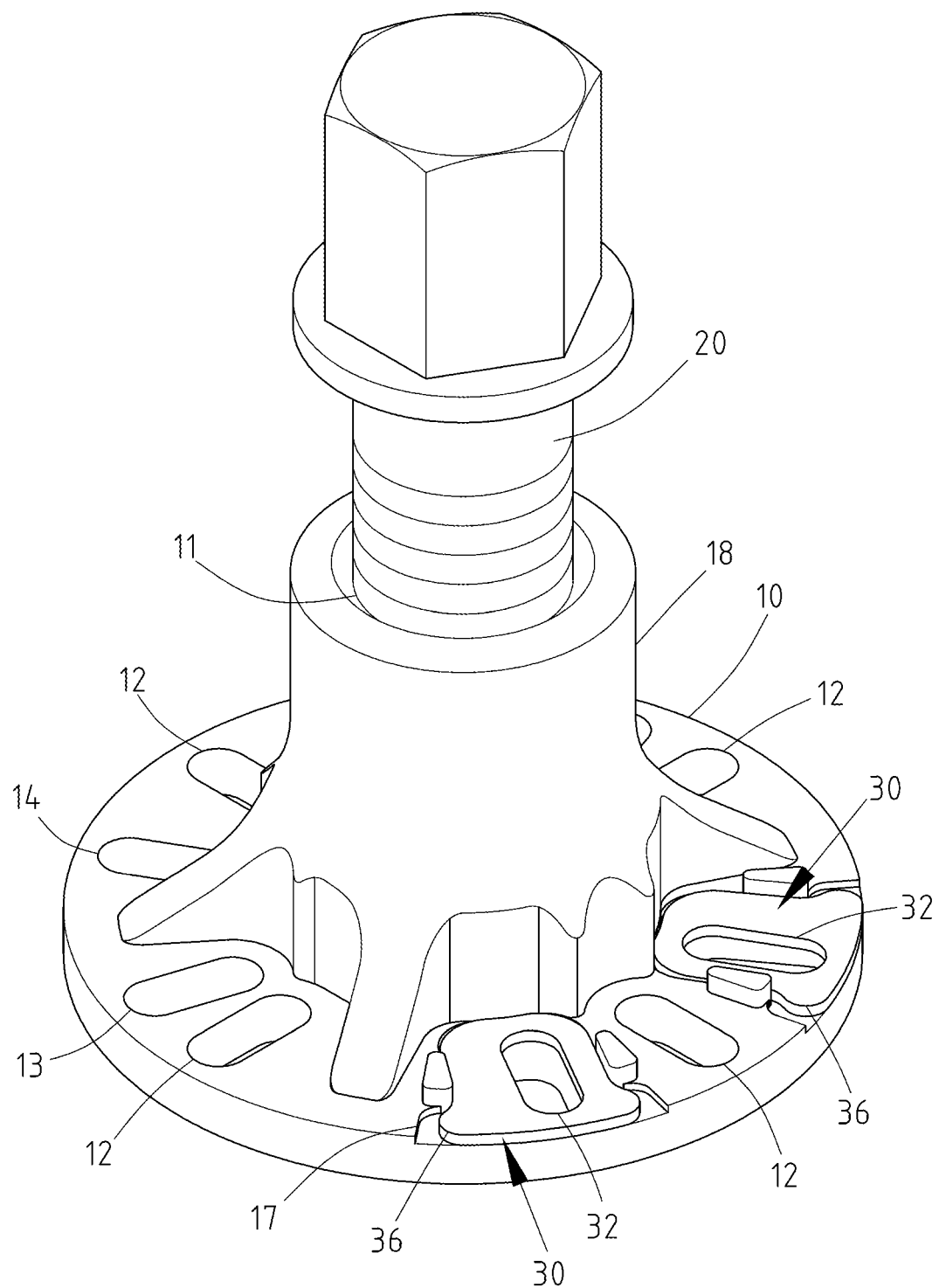
FIG. 1 is the stereogram of the preferred embodiment of the present invention.
Figure 2:
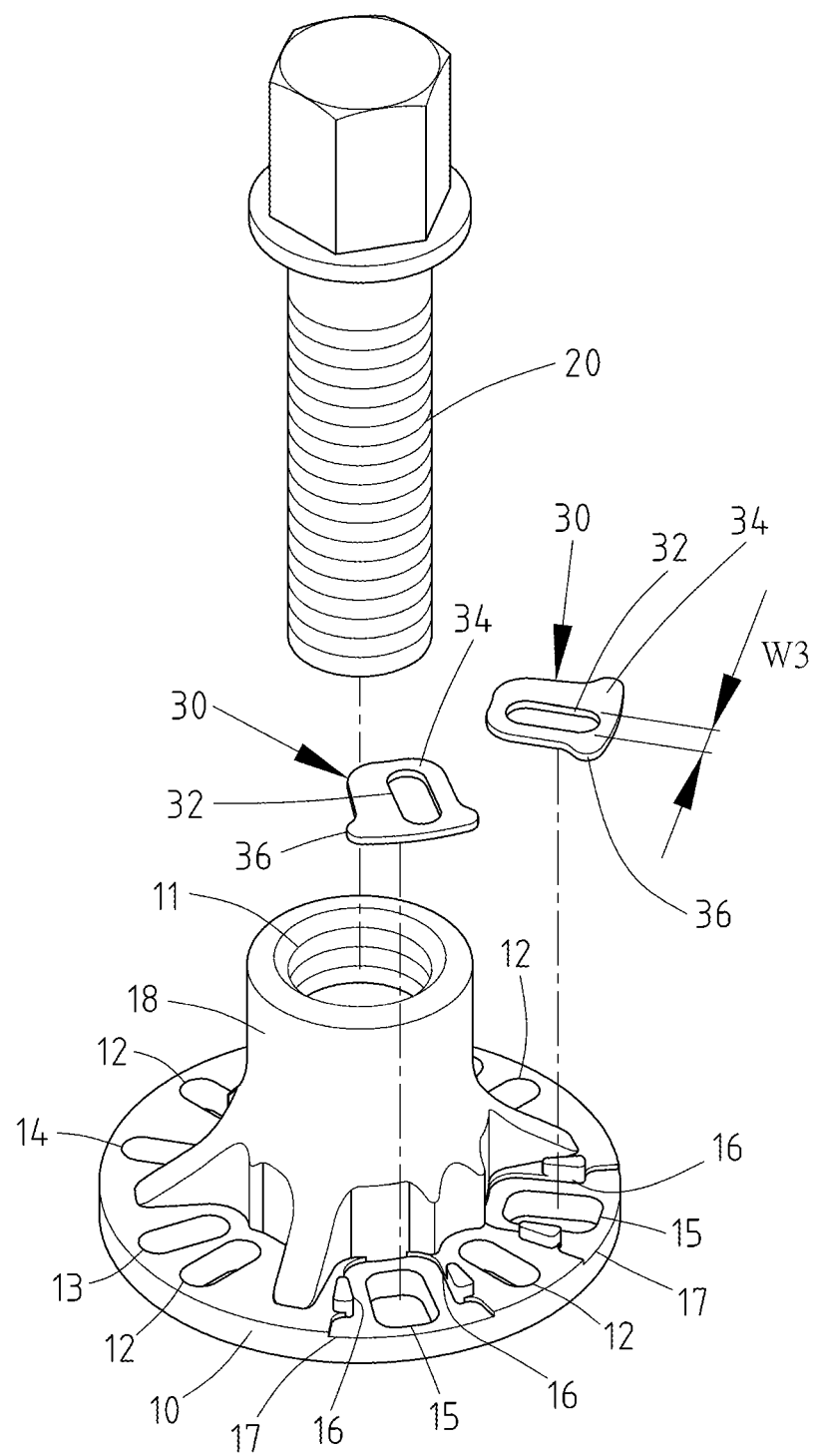
FIG. 2 is the three-dimensional exploded diagram of the preferred embodiment of the present invention.
Figure 3:
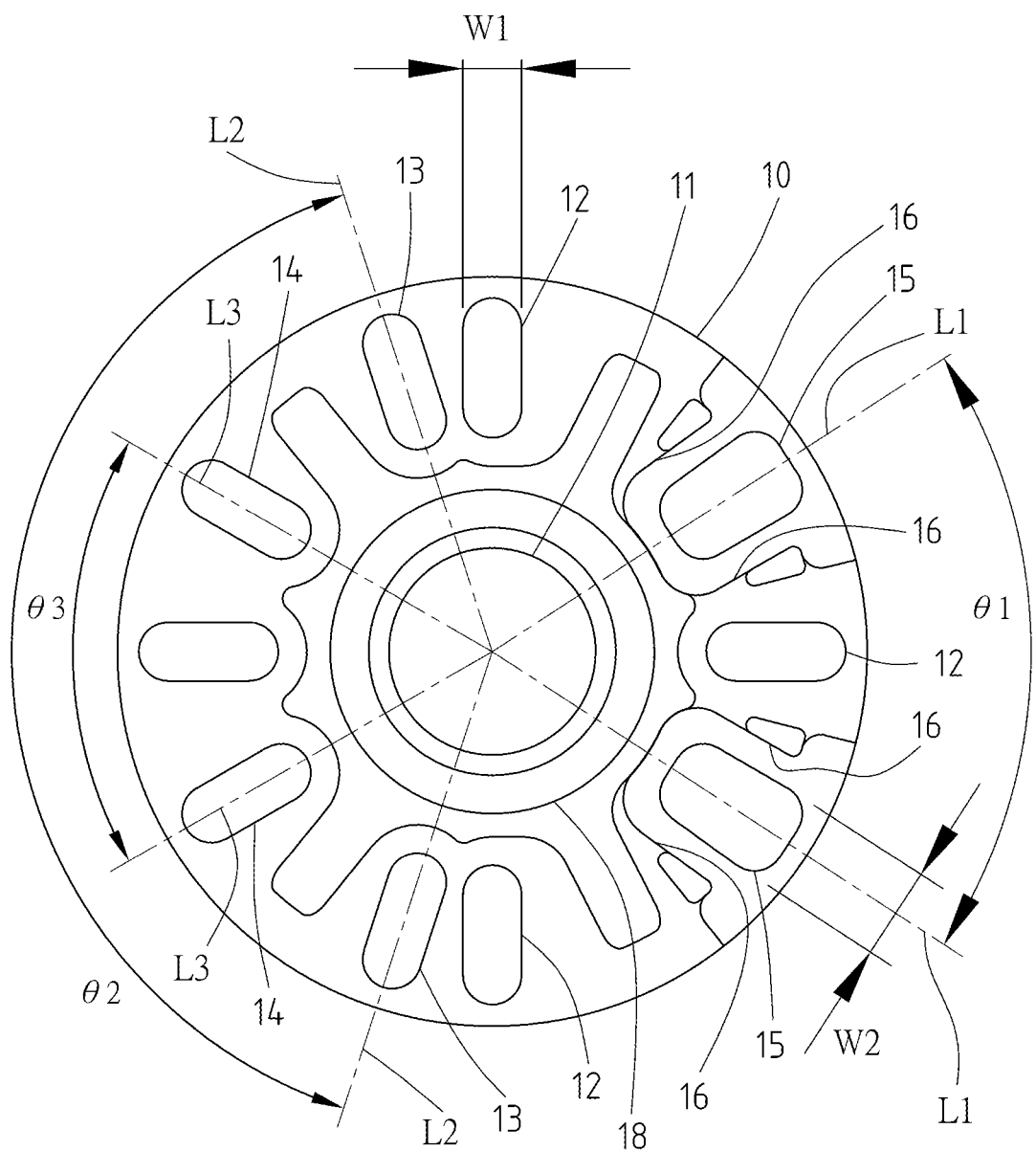
FIG. 3 is the top view of coupling disc of the preferred embodiment of the present invention.

FIG. 1 to FIG. 8 show the preferred embodiments of the extraction tool of the present invention, but the embodiments are for illustration only, the patent application is not limited to this structure.

The preferred embodiment of said extraction tool is used for removing a disc-shaped object 90 from a shaft lever 91 along axial direction, wherein the disc-shaped object 90 is provided with an shaft hole 92, the disc-shaped object 90 is provided with four or five or six positioning structures 93, and the positioning structures 93 are distributed evenly and centered on the shaft hole 92 around the shaft hole 92. The positioning structures 93 can be punch holes (as shown in FIG. 5) or bosses (as shown in FIG. 6).

The preferred embodiment includes a coupling disc 10, an operating rod 20 and two pads 30, wherein the coupling disc 10 is axially penetrated by an assembly hole 11, the operating rod 20 is axially located in the assembly hole 11. In this case, the operating rod 20 is screwed in the assembly hole 11, so that the operating rod 20 movably penetrates the assembly hole 11, the pads 30 are movably arranged in the coupling disc 10, the operating rod 20 and the assembly hole 11 can be replaced by other types of structures which are connected to each other.

The coupling disc 10 is axially penetrated by four first through grooves 12, two second through grooves 13, two third through grooves 14 and two fourth through grooves 15. The first through grooves 12, the second through grooves 13, the third through grooves 14 and the fourth through grooves 15 are distributed radially and centered on the assembly hole 11, and the first through grooves 12 are distributed evenly around the assembly hole 11. The fourth through grooves 15 are adjacent to each other, the width of the first through grooves 12, the second through grooves 13 and the third through grooves 14 is W1, W1 coordinates with the positioning structures 93. The width of the fourth through grooves 15 is W2, W2>W1. The pads 30 cover the fourth through grooves 15 respectively. The pads 30 are each penetrated by a fifth through groove 32. The fifth through groove 32 is connected to the fourth through grooves 15. The width of the fifth through groove 32 is W3, W3 coordinates with the positioning structures 93. One side of the fifth through groove 32 is in alignment relationship with either side of the fourth through groove 15; W2=1.5 W3~2 W3 is better implementation selection, and W1=W3 is better implementation selection.

Figure 4:
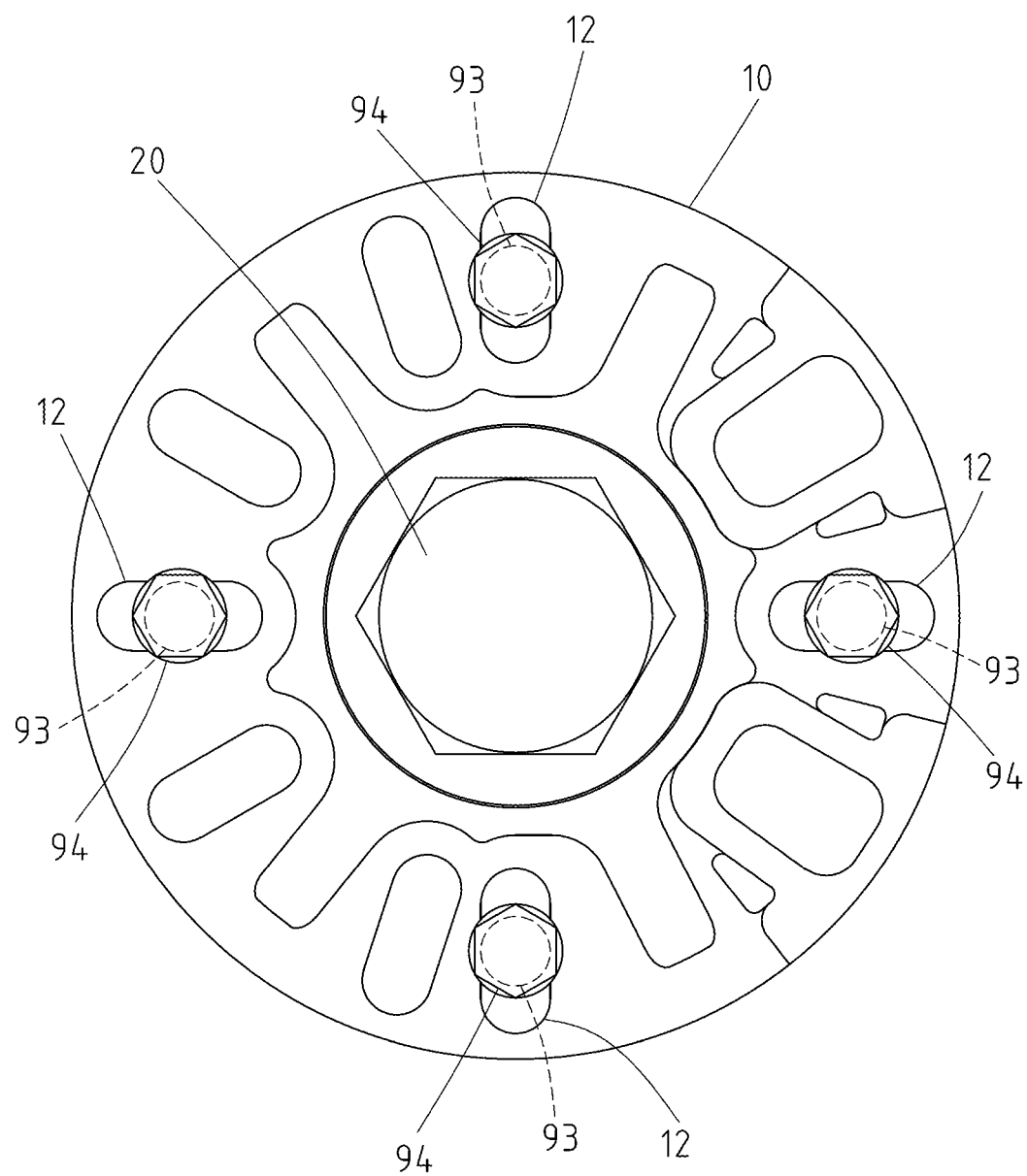
FIG. 4 is the top view of service mode (1) of the preferred embodiment of the present invention.
Figure 5:
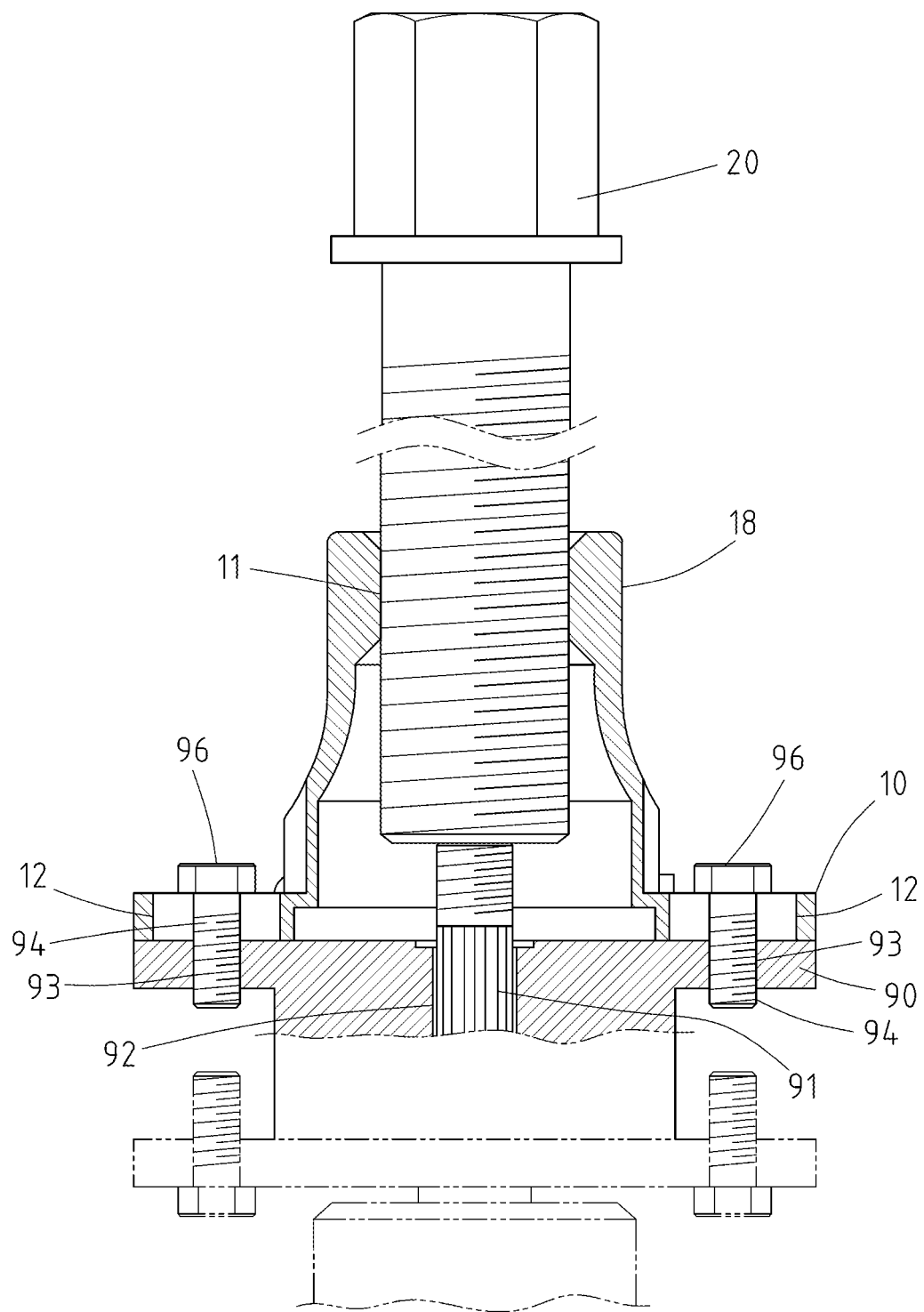
FIG. 5 is the axial section view of service mode (1) of the preferred embodiment of the present invention.
Figure 6:
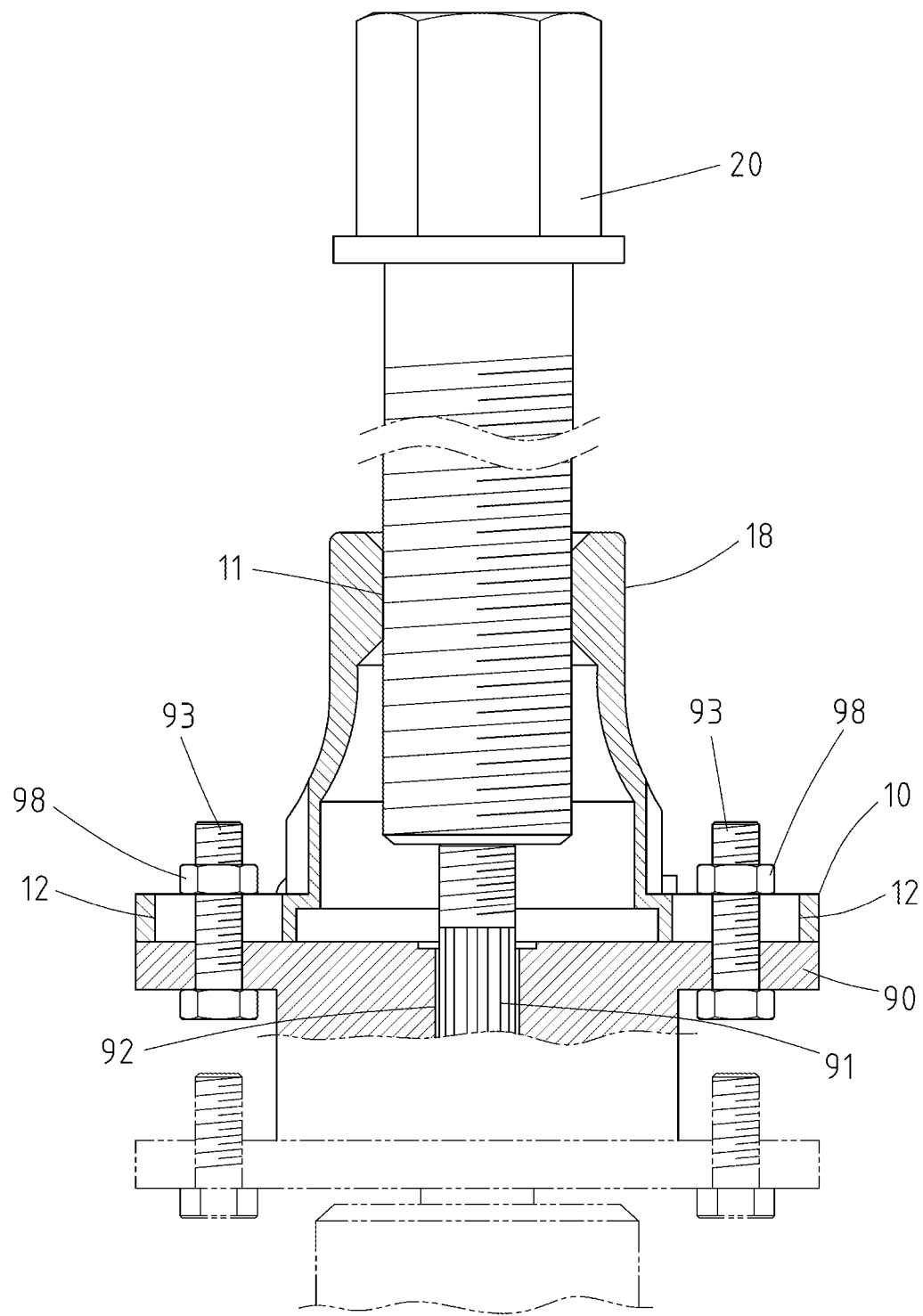
FIG. 6 is the axial section view of service mode of the preferred embodiment of the present invention applied to another type of disc-shaped object.

FIG. 4 and FIG. 5 illustrate the state of the preferred embodiment for removing the disc-shaped object 90 with four of the positioning structures 93. The disc-shaped object 90 is a disc holder, the positioning structures 93 are punch holes, the coupling disc 10 leans against the disc-shaped object 90, and the first through grooves 12 are aligned with the positioning structures 93 respectively, at this point, it is unnecessary to arrange the pads 30 in the coupling disc 10, four bolts 94 are screwed on the positioning structures 93 through the first through grooves 12, and the bolt head 96 of the bolt 94 props the coupling disc 10, the coupling disc 10 is connected to the disc-shaped object 90. The operating rod 20 is rotated, so that the operating rod 20 pushes the shaft lever 91, the disc-shaped object 90 can be removed from the shaft lever 91.

FIG. 6 illustrates the state of the preferred embodiment for removing the disc-shaped object 90 with the positioning structures 93 as bosses. The main difference from the state illustrated in FIG. 4 and FIG. 5 is that the positioning structures 93 pass through the first through grooves 12, several nuts 98 are screwed on the positioning structures 93 and propping the coupling disc 10, so as to complete the connection between the coupling disc 10 and the disc-shaped object 90.

Figure 7:
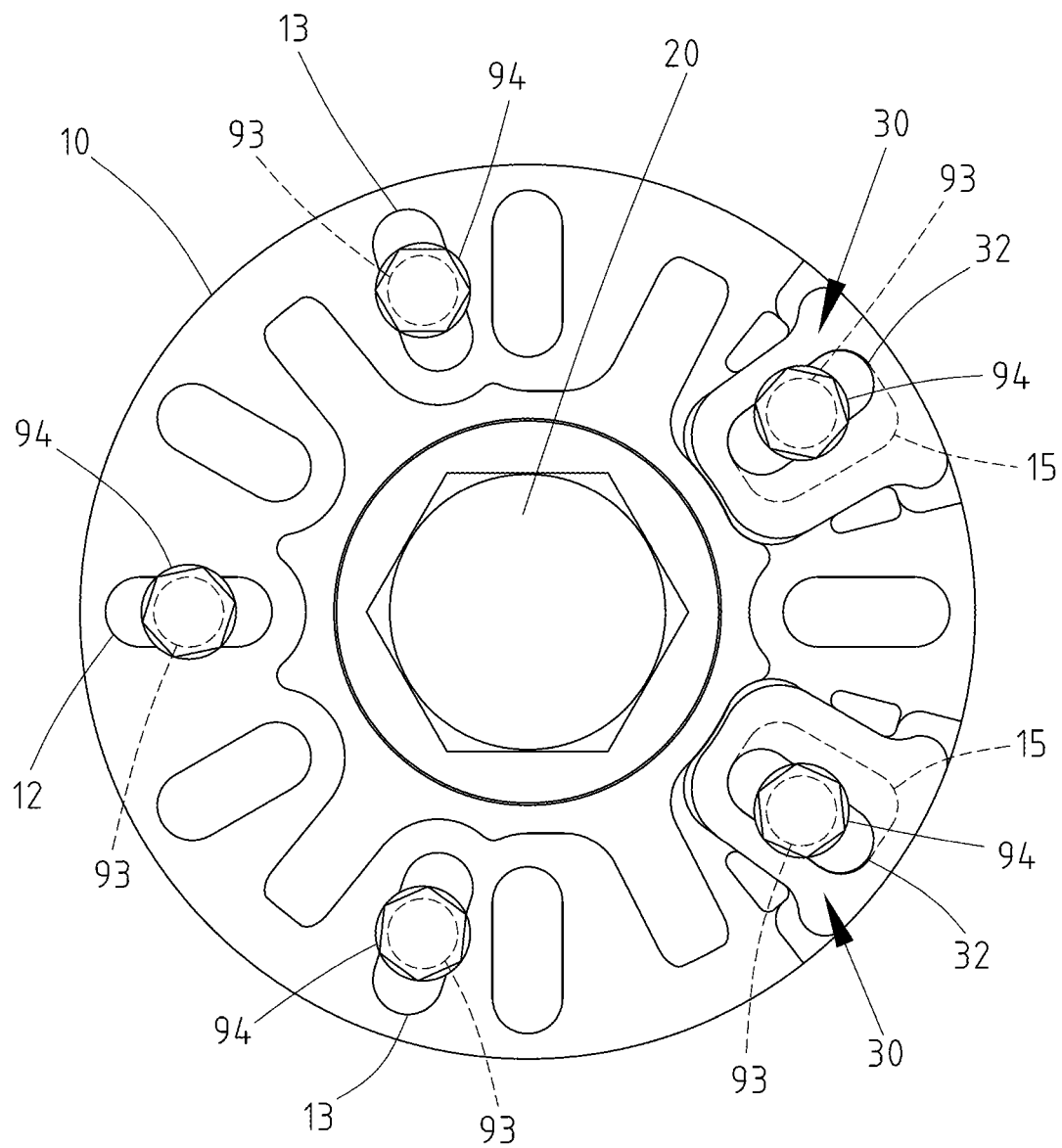
FIG. 7 is the top view of service mode (2) of the preferred embodiment of the present invention.

FIG. 7 illustrates the state of the preferred embodiment for removing the disc-shaped object 90 with five of the positioning structures 93, wherein one of the first through grooves 12, the second through grooves 13 and the fourth through grooves 15 are aligned with the positioning structures 93 respectively. The pads 30 are arranged in the coupling disc 10, and the fifth through groove 32 is aligned with the positioning structures 93. As illustrated in FIG. 4 and FIG. 5, the bolts 94 are provided for the positioning structures 93, so that the disc-shaped object 90 can be removed. In the case of the positioning structures 93 as bosses, as illustrated in FIG. 6, the nuts 98 are provided for the positioning structures 93.

Figure 8:
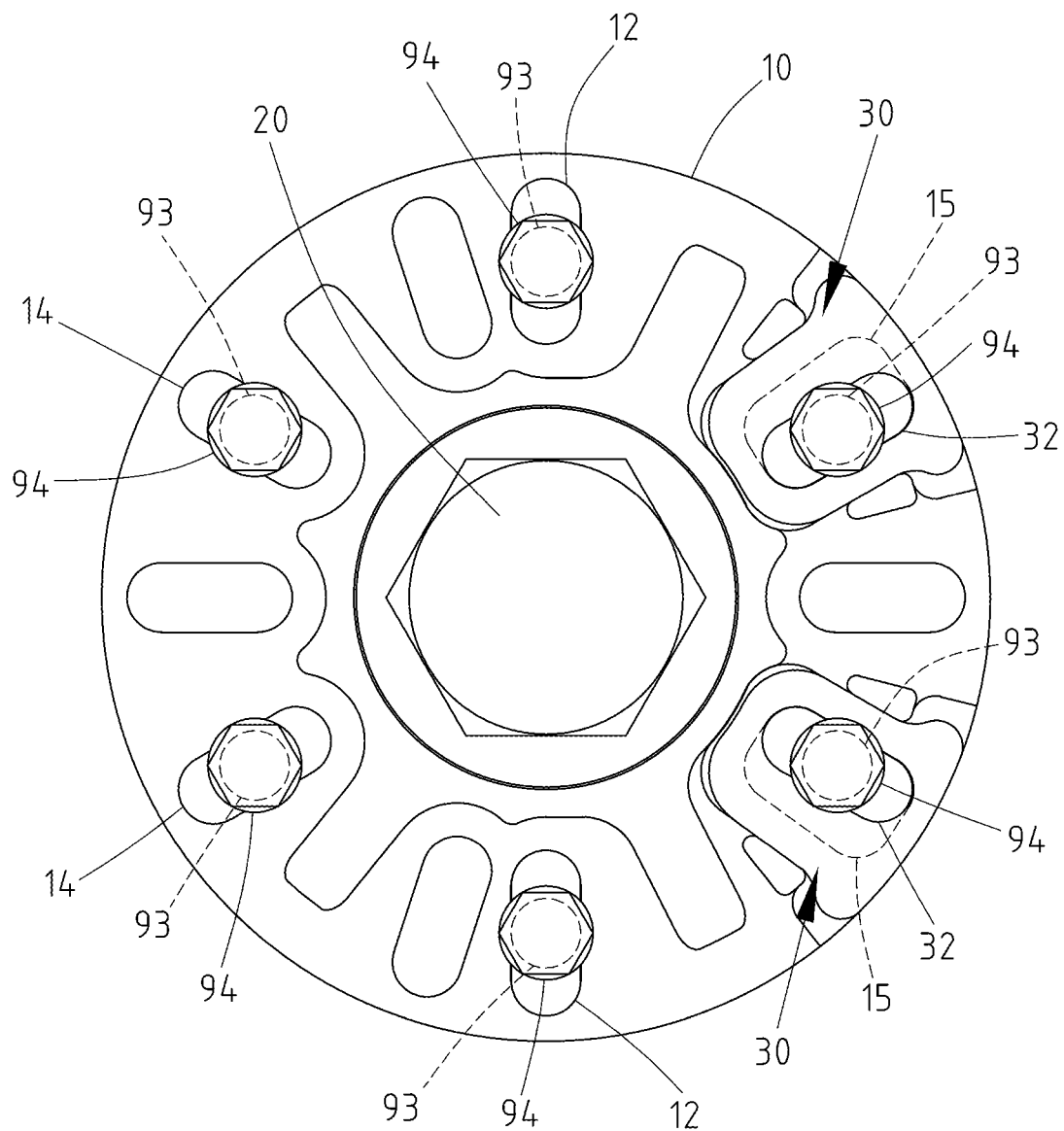
FIG. 8 is the top view of service mode (3) of the preferred embodiment of the present invention.

FIG. 8 illustrates the state of the preferred embodiment for removing the disc-shaped object 90 with six of the positioning structures 93, wherein two of the first through grooves 12, the third through grooves 14 and the fourth through grooves 15 are aligned with the positioning structures 93 respectively. The pads 30 are arranged in the coupling disc 10, and the fifth through groove 32 is aligned with the positioning structures 93. As illustrated in FIG. 4 and FIG. 5, the bolts 94 or the nuts 98 are provided for the positioning structures 93, so that the disc-shaped object 90 can be removed. In the case of the positioning structures 93 as bosses, as illustrated in FIG. 6, the nuts 98 are provided for the positioning structures 93.

The preferred embodiment can be used for removing the disc-shaped object 90 with four or five or six of the positioning structures 93. The preferred embodiment is applicable to removing the disc-shaped object 90 of various specifications. When the operating rod 20 is being operated, the coupling disc 10 and the disc-shaped object 90 are stressed equally, the removal operation has high reliability.

When the preferred embodiment removes the disc-shaped object 90, the operating rod 20 can be pulled away from the shaft lever 91 instead of said operation mode wherein the operating rod 20 pushes the shaft lever 91, the disc-shaped object 90 can be removed too. The operating rod 20 can be pulled with a tool or by hand.

FIG. 4 to FIG. 8 illustrate a disc holder as the disc-shaped object 90, not limiting the purpose of the preferred embodiment, any flywheel, belt pulley or other types of disc-shaped objects installed on a shaft lever can be removed by using the preferred embodiment.

The fifth through groove 32 is close to one side of the pads 30, hereby, when the pads 30 are arranged on the coupling disc 10, the pads 30 can be turned laterally to change the alignment relationship between the fifth through groove 32 and the fourth through grooves 15.

One of the first through grooves 12 is formed between the fourth through grooves 15. The second through groove 13 is arranged between one of the first through grooves 12 and one of the third through grooves 14. The third through groove 14 is arranged between one of the first through grooves 12 and one of the second through grooves 13.

Two first construction lines L1 pass through the center of the assembly hole 11 and the center in width of the fourth through grooves 15 respectively. A first included angle θ1 is formed between the first construction lines L1, the first included angle θ1 is 66°. Two second construction lines L2 pass through the center of the assembly hole 11 and the center in width of the second through grooves 13. A second included angle θ2 is formed between the second construction lines L2, the second included angle θ2 is 144°. Two third construction lines L3 pass through the center of the assembly hole 11 and the center in width of the third through grooves 14 respectively. A third included angle θ3 is formed between the third construction lines L3, the third included angle θ3 is 60°.

Two limitation faces 16 are formed in axial direction of the coupling disc 10 close to both sides of the fourth through grooves 15. Both sides of the pads 30 prop the limitation faces 16 respectively, so as to localize the pads 30. The pads 30 enhance the convenience of forming an alignment relationship between one side of the fifth through groove 32 and either side of the fourth through groove 15.

The coupling disc 10 is provided with two slots 17, the fourth through grooves 15 are formed in the slots 17 respectively. The limitation face 16 is formed on both sides of the slot 17, so that the pad 30 is embedded in the slot 17, the slot 17 localizes the pad 30, so that the pad 30 is far from the surface 34 of the disc-shaped object 90, the distance to the disc-shaped object 90 will not be excessively increased due to the pad 30, favorable for forming an effective and reliable associative relation between the bolts 94 or the nuts 98 and the positioning structures 93.

The pad expands towards both sides at one end far from the assembly hole 11 to form a marking part 36, hereby, when the pad is arranged on the coupling disc 10, the direction of the pad 30 can be identified according to the marking part 36, forming a foolproof mechanism to avoid arranging the pad 30 in a wrong direction which influences the reliability of alignment of the fifth through groove 32 and the fourth through groove 15.

The coupling disc 10 has an upright column 18, the assembly hole 11 is formed in the upright column 18, so as to increase the coupling length of the operating rod 20 and the assembly hole 11.

I claim:

1. An extraction tool used for removing a disc-shaped object from a shaft lever along an axial direction, wherein the disc-shaped object is penetrated by a shaft hole, the disc-shaped object is provided with four or five or six positioning structures, the positioning structures are punch holes or bosses, and the positioning structures are distributed evenly around and centered on the shaft hole; the extraction tool comprises:
   a coupling disc, the coupling disc is axially penetrated by an assembly hole;
   an operating rod, the operating rod is axially located in the assembly hole; and
   two pads, the pads are movably arranged on the coupling disc; wherein the coupling disc is axially penetrated by four first through grooves, two second through grooves, two third through grooves and two fourth through grooves; the first through grooves, the second through grooves, the third through grooves and the fourth through grooves are distributed radially around and centered on the assembly hole, and the first through grooves are distributed evenly around the assembly hole; the fourth through grooves are adjacent to each other; the width of the first through grooves, the second through grooves and the third through grooves is W1, W1 coordinates with the positioning structures, the width of the fourth through grooves is W2, W2>W1; wherein the pads cover the fourth through grooves respectively, the pads are each penetrated by a fifth through groove, each fifth through groove is connected to one of the fourth through grooves, the width of the fifth through grooves is W3, W3 coordinates with the positioning structures, one side of each fifth through groove is in alignment relationship with one of two sides of each fourth through groove.

2. The extraction tool defined in claim 1, wherein each fifth through groove is closer to one side than another side of the respective pad.

3. The extraction tool defined in claim 1, wherein one first through groove is formed between the fourth through grooves, one second through groove is arranged between one first through groove and one third through groove, one third through groove is arranged between one first through groove and one second through groove.

4. The extraction tool defined in claim 1, wherein the coupling disc forms two limitation faces in the axial direction adjacent to both sides of each of the fourth through grooves, so that two sides of each pad abut the limitation faces to form an alignment relationship between one side of each fifth through groove and a respective side of each fourth through groove.

5. The extraction tool defined in claim 4, wherein the coupling disc is provided with two slots, the fourth through grooves are formed in the slots respectively, the limitation faces are formed on two sides of the respective slots, the pads are embedded in the slots.

6. The extraction tool defined in claim 1, wherein the coupling disc has an upright column, the assembly hole is formed in the upright column.

7. The extraction tool defined in claim 1, wherein each pad expands towards two sides at one end distal from the assembly hole to form a marking part, so as to avoid arranging the pad in a wrong direction.

8. The extraction tool defined in claim 1, wherein W2 is 1.5 to 2 times W3.

* * * * *